Oct. 11, 1955   G. A. ARVIDSON   2,720,297
FLUID COUPLINGS

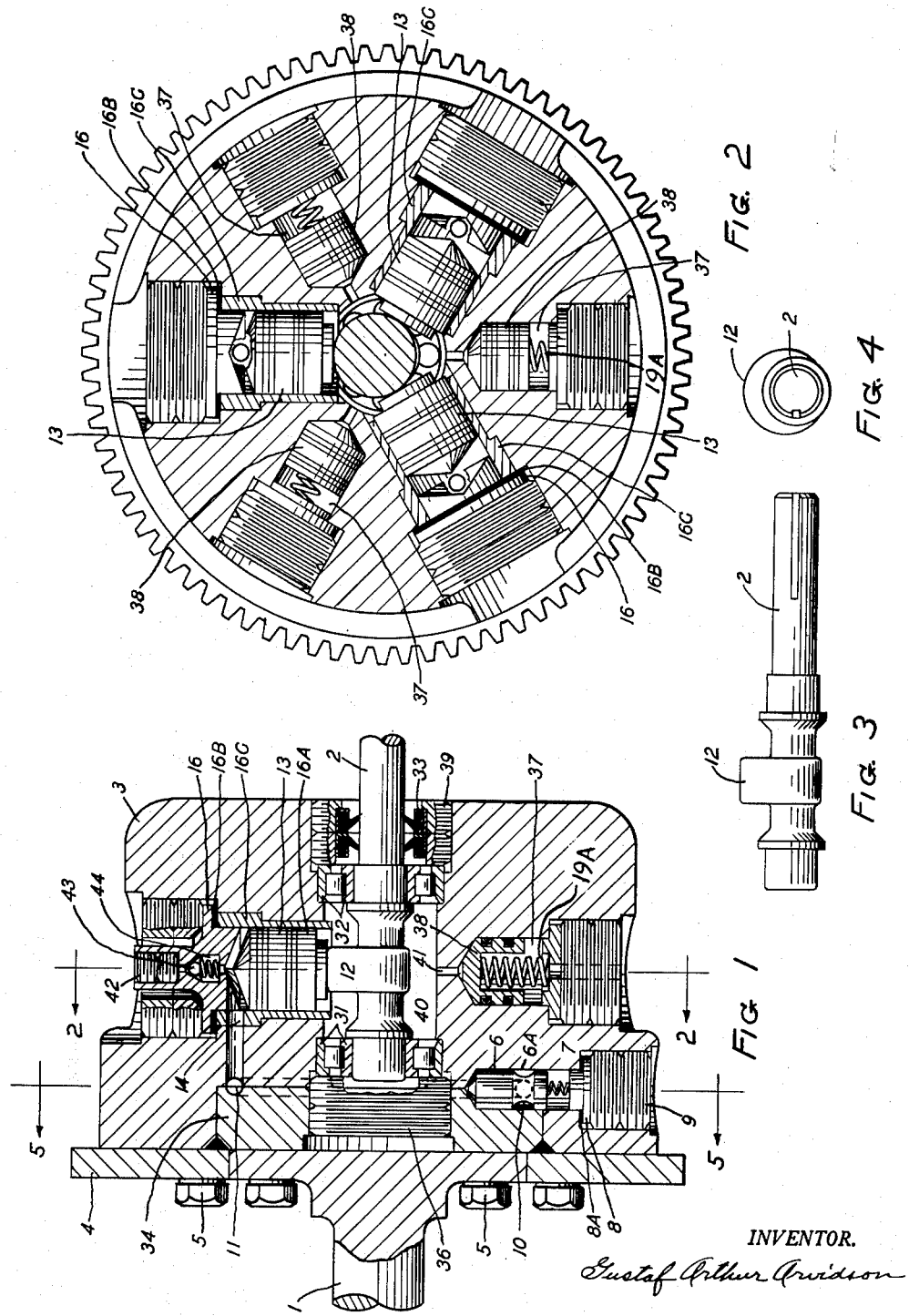

Filed June 8, 1951   2 Sheets-Sheet 2

INVENTOR.
Gustaf Arthur Arvidson

United States Patent Office 2,720,297
Patented Oct. 11, 1955

2,720,297
FLUID COUPLINGS
Gustaf Arthur Arvidson, Davenport, Iowa
Application June 8, 1951, Serial No. 230,643
3 Claims. (Cl. 192—60)

This invention relates to a fluid coupling for connecting a source of power to a means for utilizing said power and particularly to a rotary means. It partakes somewhat of the nature of a clutch but it differs therefrom in that full clutching action does not take place until full speed has been obtained. Partial clutching action may take place when full speed has not been obtained. It is an object of this invention to provide improved fluid connecting means for driving a rotary shaft.

In the drawings annexed hereto and forming a part hereof,

Fig. 1 represents a section on the plane indicated by the line 1—1 in Fig. 5;

Fig. 2 represents a section on the plane indicated by the line 2—2 in Fig. 1;

Fig. 3 represents the driven shaft, detached;

Fig. 4 represents an end view of the structure shown in Fig. 3;

Figure 7:
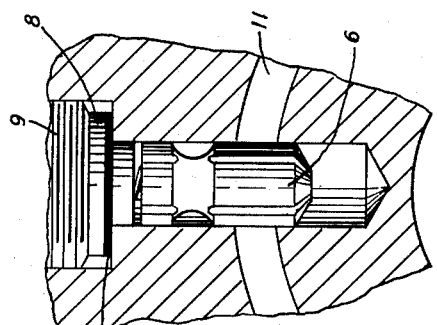
Fig. 7 is a similar view in a different position of adjustment.
Figure 9:
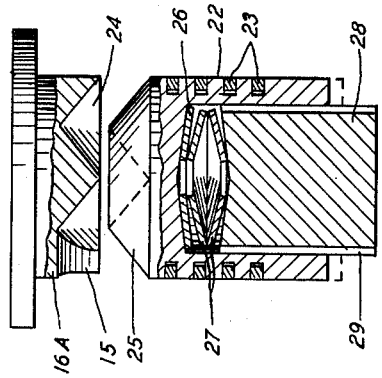
Fig. 9 represents a modified form of the type of piston shown in Fig. 8.
Figure 6:
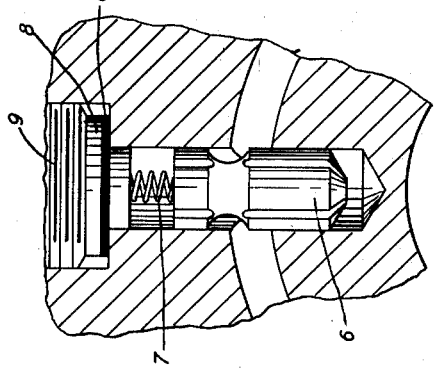
Fig. 6 is an enlarged view of a valve shown on a smaller scale in Fig. 5.
Figure 8:
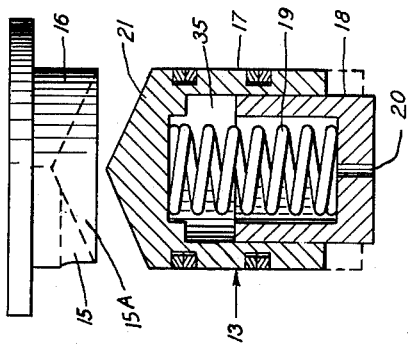
Fig. 8 represents a section of one of the pistons shown in Fig. 2.
Figure 5:
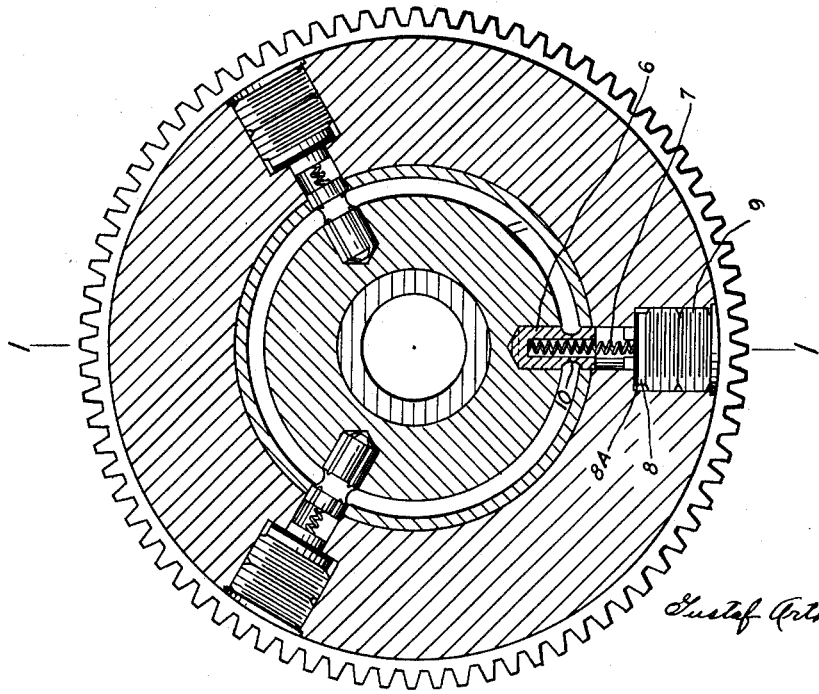
Fig. 5 represents a section substantially on the plane indicated by the line 5—5 in Fig. 1.

Reference will now be made in greater detail to the annexed drawings for a more complete description of this invention. The power input shaft from the source of power is shown at 1 and the power delivery shaft is indicated at 2. The body of the coupling is indicated at 3, and a ring gear 4 is attached to the body 3 by a plurality of bolts 5. The ring gear, if desired, drives the load directly. A plurality of valve spools 6 are mounted in the body 3 and are moved inwardly by a spring 7. The valve spools 6 have heads 8 which are fixed in the body 3 by nuts 9. Each valve spool 6 has a groove 10 which may be brought into registry with a ring groove 11. When the body is standing still and not rotating, the valve spools are forced inwardly by the springs 7 but, when the body rotates, there is a tendency for the valve spools to be forced outwardly by centrifugal motion. As they are forced outwardly, the ring groove 11 is shut off by closure of the groove 10, due to outward movement of the valve spools 6. Therefore, with the ring groove 11 closed, there is no movement of the oil around the groove. This condition is shown in Fig. 7. To allow for radial movement of the valve spools 6, cylinders, in which the valve spools are located, are extended, as shown at 6A, in Fig. 1.

When there is relative rotation of the shafts 1 and 2, there is pumping of pistons 13 because of the eccentric 12 on the shaft 2. Because of this reciprocation of the pistons 13, oil is pumped through outlets 14 to the ring groove 11 but, when the ring groove 11 is closed by the valve spools 6, there is no chance for oil to move in the ring groove 11 and, hence, no chance for motion of the pistons 13. Since the pistons 13 cannot move, the shaft 2 will have to turn. This results in the shafts 1 and 2 being coupled together and the eccentric 12, integral with the shaft 2, being driven.

A groove 15 is cut in the flange 15A of the head 16. This groove 15 is an outlet for the oil trapped between the piston 13 and the head 16. The piston 13 is composed of a pair of cylinders 17 and 18 which are pushed apart by a spring or springs 19. An opening 20 allows the escape of oil trapped between the cylinders 17 and 18. The cylinder 17 has a conical face 21, and the cooperating face of the head 16 is similarly shaped.

The modified piston 22 has piston rings 23, the same as the piston 13. The face of the piston is shaped to fit the face of the head 16A which is centrally conical, and this is surrounded by a groove 24. The outer piston 25 is hollow and has a second piston 28 reciprocable therein. The two pistons 25 and 28 are separated by a pair of "Belleville" springs. The inner faces of the outer pistons have a hardened spring 26 which serves to prevent wear. The "Belleville" springs 27, as well as the springs 19, serve as a buffer to prevent sudden shock when the eccentric 12 exerts pressure against the face of the piston 28. There are grooves 29 in the cylindrical face of the piston 28 to serve as a vent for oil between the pistons.

A gasket 16B is placed between the head 16 of the cylinder and the liner 16C, as shown in Figs. 1 and 2 to prevent escape of oil or other fluid medium. A similar gasket 8A is placed between the heads 8 of the valve spools 6 and the body 3 of the coupling, which hermetically seals the ring groove and prevents escape of oil. Between the liners 16C are expansion cylinders 37 containing spring-pressed pistons 38 which may yield under pressure and allow for expansion of fluid within the body 3. Expansion chambers 35 are located between the pistons 17 and 18 and have a connection 20 through which oil may reach the chambers 35.

There are a plurality of operating cylinders and pistons 16A, 17, and 18 which are operated by the eccentric 12. Interposed between these are similar spring-pressed pistons 38 which are pressed inwardly by the springs 19A. They are forced outwardly by the pressure of expansion of the fluid in chamber 40, reacting through the channels 41.

Within the body 3 is a central aperture 40 in which is the eccentric 12, and this aperture contains oil for the operation of this fluid coupling. Holes 41 lead from the central aperture 40 to the piston 38. An opening, closed by a splug 42 and a ball valve 43 which is forced shut by a spring 44, allows for filling of the ring groove 11 and the outlets 14. A nut 36 assists in preventing leakage of oil between the central aperture 40 and the head of the power input shaft 1. The power delivery shaft 2 has roller bearings 31 and 32 and an oil seal 33 which is held in place by nuts 39. The nuts 36 and 39 lock the roller bearings 31 and 32 in place. A head 34 is welded to the body 3 and keeps the oil from escaping between the ring gear 4 and the body 3.

Power is applied to shaft 1, and this drives the body 3, secured thereto. Since the valves 6 and 10 are not closed, fluid can be forced around the channel or ring groove 11. However, as shaft 1 speeds up, the valves 6 may be closed or partially closed by centrifugal force. This causes the shaft 2 to be operated, since the piston 13 cannot be operated and, without operation of the piston 13, shaft 2 will be operated.

It is of course understood that the specific description of structure set forth above may be departed from without departing from the spirit of this invention as disclosed in this specification and as defined by the appended claims.

Having now described my invention, I claim:

1. A pair of axially aligned shafts connectable in driving relation, one of said shafts being a driving shaft and the other a driven shaft, a flange on the end of said driving shaft, a body secured to said flange, said body having an axial opening therethrough, bearings located in said opening, the driven shaft being supported in said bearings, said body connected in fluid-tight relation to the flange, the driving shaft rotating the body, a plurality of cylinders spaced equally around the second shaft, a piston in each cylinder, an eccentric on the second shaft in the same plane with the pistons, the pistons being reciprocated by the eccentric, the cylinders having an outlet at their outer ends, the pistons forcing oil out through the outlets, a ring groove in the body, the outlets leading to said ring groove, valve spools intersecting said ring groove, the valve spools being forced out by the rotation of the first shaft and, when forced out, closing the ring groove, the pistons comprising two coaxial pistons, one within the other and reciprocating relatively to each other, the inner piston being forced outwardly by a spring, whereby said pistons may allow longitudinal expansion or contraction.

2. A coupling for connecting a pair of axially aligned shafts, one of which is a driving shaft and the other of which is a driven shaft, said coupling comprising a rotatable substantially fluid-tight body having a plurality of cylinders spaced equally around the axis of rotation of said body, a piston unit in each cylinder, an eccentric rotatably located within said body, whereby the pistons are reciprocated by rotation of said eccentric relative to said body, a ring groove formed in said body, an outlet extending from the outer end of each cylinder to said ring groove, valve means comprising a piston, spring actuated, transversely of the ring groove for controlling the flow of fluid between said ring groove and said cylinders, thereby controlling said coupling, each of said piston units comprising a pair of radially spaced pistons in each cylinder, the pistons of each pair being relatively movable, and spring means between the pistons of each pair of radially spaced pistons for resisting said relative movement, yielding of said spring means accommodating expansion of fluid in said ring groove, outlets, and cylinders.

3. A shaft coupling comprising a pair of shafts to be coupled, a body serving to couple said shafts together, one of said shafts having a lateral extension, the other of said shafts having an eccentric within said body, cylinders and cooperating pistons within said body and in radial alignment with the eccentric, a ring groove concentric with relation to the axis of the shafts and spaced axially with relation to the eccentric, outlets from the cylinders to the ring groove, valve spools movable transversely across the outlets and radially of said body for controlling fluid flow between the cylinders and the ring groove, and spring means acting against said valve spools for urging them radially inwardly of said body into positions opening communication between said groove and cylinders, said valve spools being actuated into closing position by centrifugal force due to rotation of the body and preventing circulation of the oil in the ring groove, thereby preventing relative rotation of the shafts.

References Cited in the file of this patent

UNITED STATES PATENTS

| | | |
|---|---|---|
| 2,076,887 | Gambrell | Apr. 13, 1937 |
| 2,172,975 | Huthsing | Sept. 12, 1939 |
| 2,620,053 | Lyman | Dec. 2, 1952 |
| 2,664,767 | Kuhn | Jan. 5, 1954 |

FOREIGN PATENTS

| | | |
|---|---|---|
| 76,193 | Sweden | Oct. 27, 1930 |
| 228,911 | Great Britain | Jan. 14, 1926 |
| 415,572 | Great Britain | Aug. 30, 1934 |
| 785,646 | France | May 20, 1935 |
| 464,536 | Great Britain | Apr. 20, 1937 |